United States Patent [19]

Panten et al.

[11] Patent Number: 4,723,527
[45] Date of Patent: Feb. 9, 1988

[54] PROCESS FOR INCREASING THE PROCESS TEMPERATURE OF AN AIR COMPRESSING INTERNAL COMBUSTION ENGINE

[75] Inventors: Detlef Panten, Korb; Jürgen Jegelka, Aichwald; Roland Schubert, Stuttgart, all of Fed. Rep. of Germany

[73] Assignee: Daimler-Benz Aktiengesellschaft, Stuttgart, Fed. Rep. of Germany

[21] Appl. No.: 15,791

[22] Filed: Feb. 17, 1987

[30] Foreign Application Priority Data

Feb. 14, 1986 [DE] Fed. Rep. of Germany ....... 3604692

[51] Int. Cl.$^4$ .................. F02D 21/08; F02D 1/10; F02M 31/06; F02M 25/06
[52] U.S. Cl. ................... 123/571; 123/52 M; 123/556; 123/569
[58] Field of Search .............. 123/52 M, 357, 372, 123/556, 568, 569, 571

[56] References Cited

U.S. PATENT DOCUMENTS

| | | | |
|---|---|---|---|
| 4,231,343 | 11/1980 | Alf et al. | 123/556 |
| 4,353,344 | 10/1982 | Bergmann et al. | 123/569 |
| 4,388,909 | 6/1983 | Ogasawara et al. | 123/569 X |
| 4,399,774 | 8/1983 | Tsutsumi | 123/556 X |
| 4,411,242 | 10/1983 | Igashira et al. | 123/569 |
| 4,416,243 | 11/1983 | Naito et al. | 123/569 |
| 4,495,929 | 1/1985 | Maeda et al. | 123/569 |
| 4,545,357 | 10/1985 | Kearsley et al. | 123/556 |
| 4,548,184 | 10/1985 | Laufer et al. | 123/569 |
| 4,640,256 | 2/1987 | Conrad et al. | 123/568 |

FOREIGN PATENT DOCUMENTS

2650946 5/1978 Fed. Rep. of Germany.
3419069 11/1984 Fed. Rep. of Germany.

Primary Examiner—Willis R. Wolfe
Attorney, Agent, or Firm—Barnes & Thornburg

[57] ABSTRACT

A process for increasing the process temperature of an air compressing internal combustion engine includes mixing exhaust gas with the intake air. The amount of exhaust gas to be recirculated is set with reference to speed and load. To achieve an increased process temperature within a short period and with unrestricted internal combustion engine power, the intake air is preheated, taking into account a predetermined limit temperature of the coolant, when the engine is operating between a lower and upper speed range at 90% useful power. The intake air is also preheated in a subsequent speed range, extending up to 90% of the nominal engine speed, at 75% useful power of the engine. Exhaust gas is mixed in with the intake air between a medium to upper speed range and up to 75% of the useful power. The recirculated stream of exhaust gas is reduced, depending on the vehicle velocity and the percentage of useful power.

16 Claims, 7 Drawing Figures

PROCESS FOR INCREASING THE PROCESS TEMPERATURE OF AN AIR COMPRESSING INTERNAL COMBUSTION ENGINE

BACKGROUND AND SUMMARY OF THE INVENTION

The invention relates to a process for increasing the process temperature of an air compressing internal combustion engine with an exhaust gas recirculation line arranged between the exhaust gas line and an intake air line. A final control element is adjusted by a power-assisted actuator activated by a control unit. This actuator sets an amount of recirculated exhaust gas in dependence upon speed and loading of the internal combustion engine and atmospheric pressure.

It is shown in German published unexamined patent application No. 34 19 069 to determine the amount of recirculated exhaust gas with an air compressing internal combustion engine on the basis of speed and load of the internal combustion engine and also the intensity of the light fuel flame burning in the cylinder.

Furthermore, an internal combustion engine with an apparatus for preheating the combustion air is shown in German published unexamined patent application No. 26 50 946. A control of the preheated combustion air is performed as a function of the coolant temperature.

An object of the present invention is to achieve an increased process temperature in a short period, with unrestricted power output of the internal combustion engine, while taking emissions into account.

These and other objects are achieved according to the present invention by a process for increasing the process temperature of an air compressing internal combustion engine in which the process includes preheating of the intake air when the temperature of the coolant is below a first predetermined limit, and: (a) the speed of the engine is between a lower speed and an upper speed, and said engine is operating at a power level below 90% of the useful power of the engine; or (b) the engine speed is between this upper speed and a speed that corresponds to 90% of the nominal engine speed, and the engine is operating at a power level below 75% of the useful power of the engine. This process also includes recirculating exhaust gas when the coolant temperature is between the first predetermined limit and a lower, second predetermined limit and the upper and higher speed, and said engine is operating at a power level below 75% of the useful power of the engine. This recirculation is reduced when a predetermined vehicle velocity is exceeded and the engine is operating at a power level at or above 50% of the useful power of the engine.

The objects of the invention are also achieved according to another preferred embodiment of the present invention for a process for increasing the process temperature of an air compressing internal combustion engine in which a control unit sets an instantaneous amount of recirculated exhaust gas with reference to speed and load of the internal combustion engine, and also a coolant temperature and atmospheric pressure. The process includes determining a temperature value dependent on load and speed from a predetermined family of characteristic intake air temperature curves. The temperature value is corrected in dependence on coolant temperature, and then supplied as a set value to a governor which changes the influx of preheated intake air to the stream of intake air by a first final control element. Exhaust gas is mixed with the preheated stream of intake air by the operation of a second final control element which is in the exhaust gas recirculation line, the mixing being done depending upon a predetermined internal combustion engine speed. The pivot angle of a pressure control valve which is upstream of the junction of the exhaust gas recirculation line into an air circulation housing is controlled depending on load and speed from a predetermined family of characteristic pressure control valve curves. The pivot angle is corrected depending on intake air temperature, coolant temperature and atmospheric pressure. The corrected pivot angle is supplied to a pressure control valve position governor which positions the pressure control valve via an actuator. The position of the second final control element is then determined in dependence on speed and load from a family of characteristic exhaust gas recirculation curves. The final control element position is then corrected depending on the intake air temperature, coolant temperature and atmospheric pressure. The corrected final control element position is then supplied to an exhaust gas recirculation position governor.

The process according to the invention has the advantage that, by the combined use of exhaust gas recirculation and intake preheating, an increased process temperature for the purpose of regeneration of a soot burn-off filter in the exhaust system of the air compressing internal combustion engine for example, is achieved very early. Further, because of the interaction of the intake air preheating and the exhaust gas recirculation, the latter is used only to a reduced extent. Owing to a reduced amount of recirculated exhaust gas, there are also fewer sulphur-contaminated particles supplied to the combustion chamber, and thus also to the lubricating oil in which acids form. The lesser loading of the lubricating oil makes more economical oil change intervals feasible at the same time along with less wear.

Other objects, advantages and novel features of the present invention will become apparent from the following detailed description of the invention when considered in conjunction with the accompanying drawings.

DETAILED DESCRIPTION OF THE DRAWINGS

Figure 1:
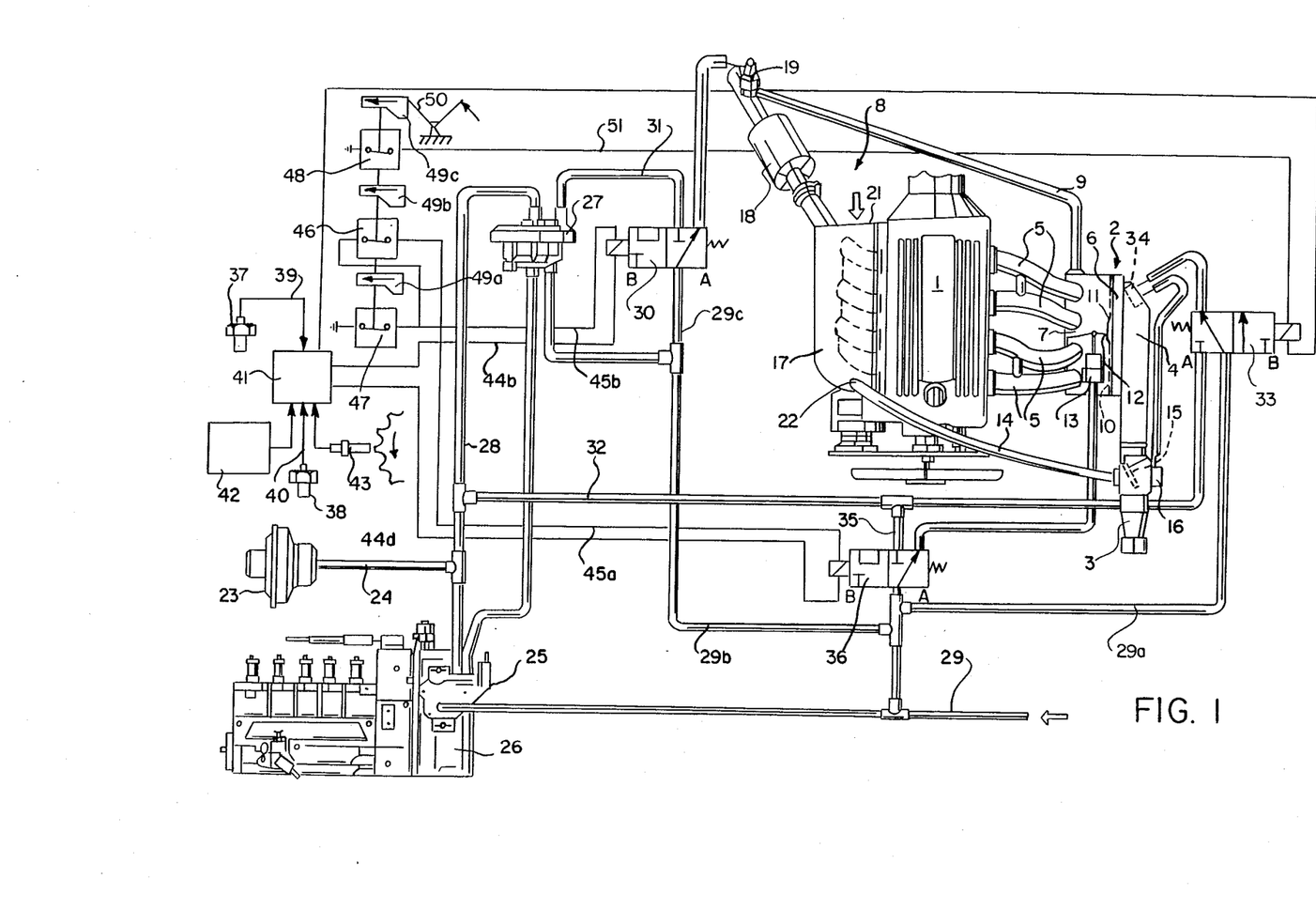
FIG. 1 diagrammatically shows an apparatus for controlling an intake air preheating and an exhaust gas recirculation on an air compressing internal combustion engine.

In FIG. 1, an air compressing internal combustion engine 1 with an apparatus for controlling the intake air preheating and an exhaust gas recirculation is diagrammatically represented. The intake system 2 of the internal combustion engine 1 comprises an intake pipe 3 with an air circulation housing 4, from which individual suction pipes 5 lead to the cylinders of the internal combustion engine 1. In the box-shape designed air circulation housing 4 which accommodates an air filter 6, in a clean air side, an exhaust gas recirculation line 9 opens into a mixing segment 7. This exhaust gas recirculation line 9 connects the exhaust system 8 and the intake system 2. Provided between the mixing segment 7 and the clean air side is a partition 10, having a passage 11 in which a pressure control valve 12 is arranged. In the closed position of the pressure control valve 12, an annular gap is formed between the valve 12 and the limiting wall of the passage 11. The pressure control valve 12 is pivotable with a diaphragm load cell 13 arranged on the air circulation housing side. A line 14 opens into the intake pipe 3 carrying heated air. A final control element 15 is arranged on the junction side and is pivotable by means of a power-assistable actuator 16.

The exhaust system 8 of the internal combustion engine 1 comprises an exhaust manifold 17 with an adjoining soot burn-off filter 18. The exhaust gas recirculation line 9 branches off from the exhaust manifold 17. A valve 19 in the exhaust gas recirculation line 9 changes the flow cross-section of the line 9 and is equipped with a power-assisted actuator. The exhaust manifold 17 is enclosed by an air scoop, which is detachably fixed on the internal combustion engine side. On the opposite leading face of the air scoop, the scoop has an opening 21. On the upper side of the air scoop is provided a clearance 22, to which the line 14 leading to the intake pipe 3 connects.

From a vacuum pump 23 driven on the internal combustion engine 1, there leads a tubular line 24 to a vacuum control valve 25, which is fixed on a fuel injection pump 26 of the internal combustion engine 1. By means of the adjusting lever (schematically shown as 50) of the fuel injection pump 26, the pretension of a spiral spring (also not shown) of the vacuum control valve 25 can be adjusted. A diaphragm (not shown) abuts the spring, this diaphragm being supplied with the partial vacuum$_{uw}$ of the vacuum pump, and from which a modulated partial vacuum$_{uw}$, dependent on the angle of the adjusting lever, is output and supplied through a line to a pressure converter 27. The pressure converter 27 is subjected through a line 24, 28 to the vacuum pump 23, and also through a line 29, 29b to the atmospheric pressure, which is taken from the passenger compartment. The output modulated partial vacuum$_{uw}$ of the pressure converter 27 is supplied to the actuator of the valve 19 with the interposing of a 3/2-way directional valve 30 arranged in a line 31.

A line 32 branches from the line 28, and is indirectly connected to the actuator 16. A pressure modulator 34 is provided downstream of an electrically operable 3/2-way directional valve 33 arranged in the line 32. The partial vacuum for the actuator 16 is modulated as a function of the temperature of the air in the air circulation housing 4. From the vacuum line 32 there branches a line 35 leading to the diaphragm cell 13 through an electrically operable 3/2-way directional valve 36. Connected to the atmospheric ventilation connections of the 3/2-way directional valves 30, 33, 36 and of the vacuum control valve 25 are lines 29a–c, which open into a common line 29, which leads to the passenger compartment.

In a coolant circuit (not shown in more detail) of the internal combustion engine 1, a first temperature-dependently operable switch 37 is arranged, which is closed from a coolant temperature of 297° K. A second switch 38 in the coolant circuit is closed from 369° K. The switches 37, 38 are connected by means of signal-transmitting lines 39, 40 to a control unit 41 of conventional design to which the output signal of a sensor 42 for the vehicle velocity is supplied as well as the output signal of a sensor 43 for recording the crankshaft speed. The control unit 42 activates the 3/2-way directional valve 36 and the 3/2-way directional valve 30 via lines 44a, 44b. The electromagnetic actuators of the 3/2-way directional valves 30, 36 are connected by lines 45a, 45b to the switch 46, 47. The switches 46, 47 and a further switch 48 are operable by means of a cam disc 49a–c in effective connection with the adjusting lever 50 of the fuel injection pump governor 26. From the switch 48, a line 51 leads to the electromagnetic actuator of the 3/2-way directional valve 33.

Figures 2, 4:
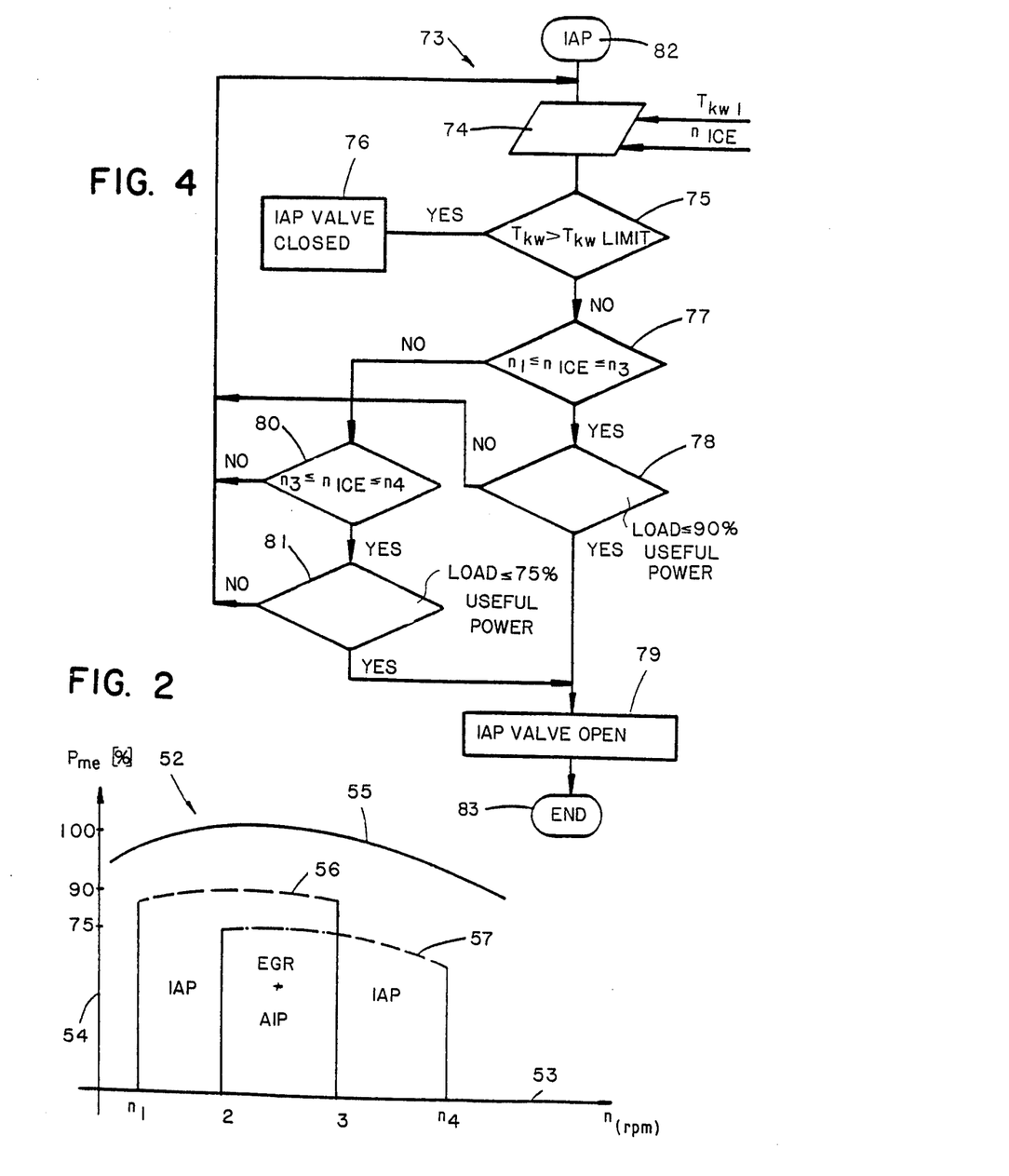
FIG. 2 is a diagram illustrating a preferred embodiment of the application ranges of the intake air preheating and of the exhaust gas recirculation as a function of the effective mean pressure and the speed of the internal combustion engine.
FIG. 4 shows a flow chart for controlling the intake air preheating with the embodiment of the apparatus in FIG. 1.

In diagram 52 in FIG. 2, the speed n of the internal combustion engine is plotted on the abscissa 53, and the effective mean pressure $P_{me}$ is plotted on the ordinate 54. The diagram 52 shows the power variation curve of a torque characteristic 55 in the full load range, a 90% useful power characteristic 56 from speed section $n_1$ to speed section $n_3$, and a torque characteristic 57 at a 75% useful power from speed section $n_2$ to 90% nominal speed $n_4$. When operating the internal combustion engine in the speed section $n_1$–$n_3$ and below the characteristic 56, and also in the speed section $n_3$–$n_4$ below the characteristic 57, an intake air preheating (IAP) is performed. An exhaust gas recirculation is performed if the internal combustion engine is operated in the speed section $n_2$–$n_3$ and below the characteristic 57, irrespective of the intake air preheating. The preheating and the exhaust gas recirculation are only used if predetermined further operating conditions are met.

Figure 3:
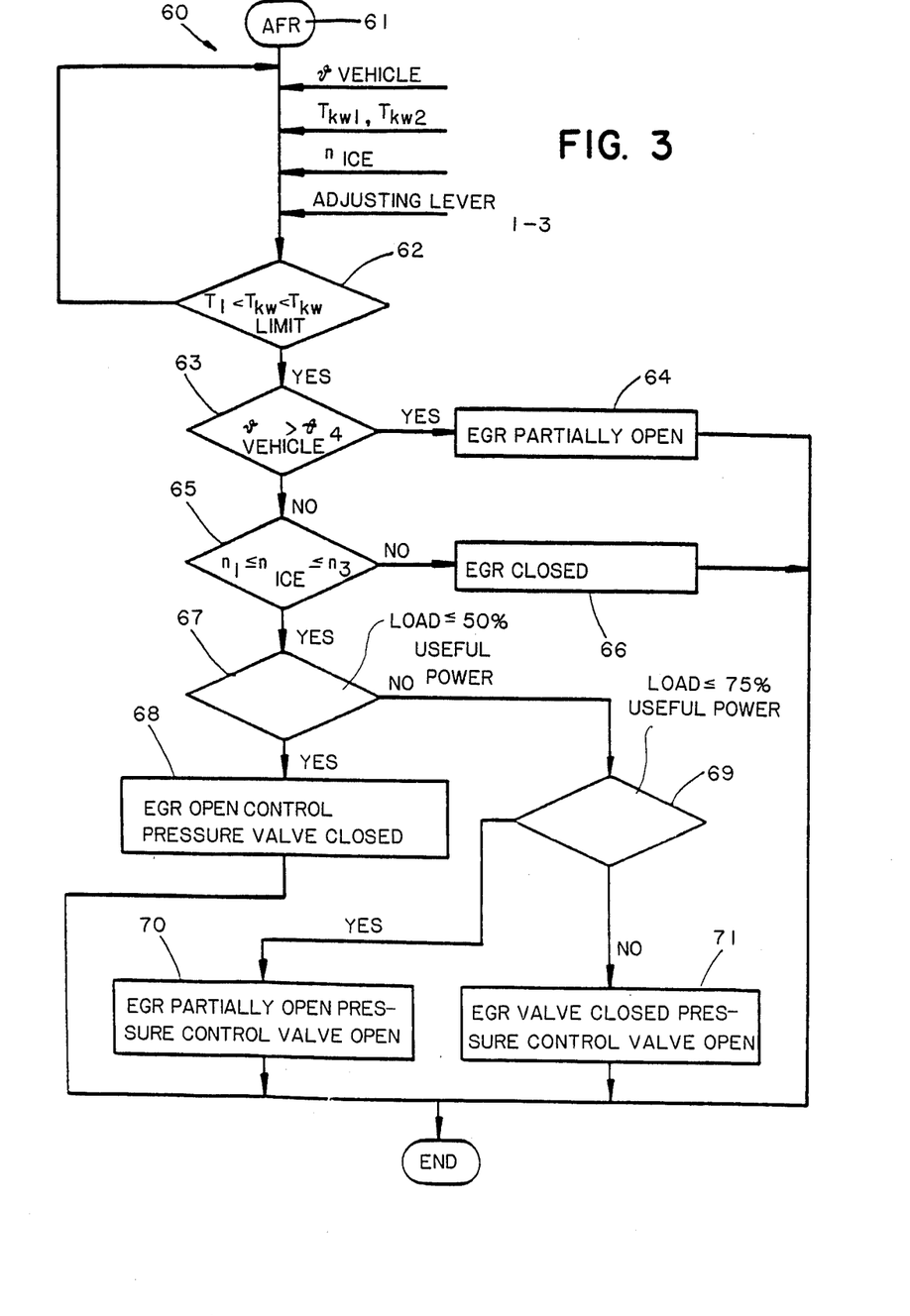
FIG. 3 shows a flow chart for controlling the exhaust gas recirculation for the embodiment of the apparatus shown in FIG. 1.

In FIG. 3, a control of the exhaust gas recirculation is represented in a flow chart 60. The flow chart 60 starts with a terminal 61, after which the velocity of the vehicle, the coolant temperature $T_1$ and $T_2$, the internal combustion engine speed and the adjusting lever position are supplied.

In a decision block 62, it is checked whether the present coolant temperature is within predetermined limits $T_1 < T_{kw} < T_{kw}$ limit, where $T_1 = 298$ K and $T_{kw}$ limit $= 369$ K, for example. At a vehicle velocity of $< v_4$, of 88 km/h, for example, determined from the decision block 63, the position of the exhaust gas recirculation valve 19 is determined in a first operation block 64. If the instantaneous internal combustion engine speed is outside the predetermined speed range $n_1 \leq n_{ICE} \leq n_3$, where $n_1 = 1250$ rpm, and $n_3 = 2950$ rpm, a decision block 65 activates an operation block 66 for closing of the exhaust gas recirculation valve 19. If the speed is within the defined range, a branch is made from a decision block 67 to an operation block 68 for opening of the exhaust gas recirculation valve and closing of the pressure control valve when the load is equal to or <50% of the useful power.

For a load which is <50% of the useful power, a branch is made from a further decision block 69 to an operation block 70, in which an exhaust gas recirculation valve stroke corresponding to the partial vacuum is set and the pressure control valve 12 is opened, when the load is equal to or <75% of the useful power. If the decision block 69 activates an operation block 71, the exhaust gas recirculation valve 19 is closed and the pressure control valve 12 is opened. The operation blocks 64, 66, 70, 71 activate an end terminal.

A sequence of control for the intake air preheating is represented in a flow chart 73 in FIG. 4. The coolant temperature $T_{kw1}$ and the speed of the internal combustion engine n are supplied to an input box 74. A check is made in a first decision block 75 whether the temperature of the coolant exceeds a predetermined coolant temperature of 369° K. In the case of the limit temperature $T_{kw}$ being exceeded, the intake air preheating valve 15 is closed by an operation block 76. If the coolant temperature $T_{kw}$ is within the predetermined limits and the instantaneous speed of the internal combustion engine is within the speed range $n_1 \leq n_{ice} \leq n_3$ where $n_1 = 1250$ rpm and $n_3 = 2950$ rpm, following a second decision block 77, a check is made in a third decision block 78 whether the instantaneous load of the internal combustion engine is equal to or <90% of its useful power. The intake air preheating valve 15 is activated and opened by a subsequent operation block 79. If the condition of the decision block 77 is not met, if the internal combustion engine is operated in a speed range of $n_3 \leq n_{ice} \leq n_4$, where $n_3 = 2950$ rpm and $n_4 = 90\%$ of the nominal engine speed, a further decision block 80 activates a decision block 81. If the load of the internal combustion engine is equal to or <75% of its useful power, and activation of the operation block 79 is performed and subsequently the terminal 83. If the conditions of the decision blocks 78, 80, 81 are not met, a feedback branch is performed to the beginning of the control, the terminal 82.

During operation of the internal combustion engine 1, the coolant temperature is recorded by the sensors 37 and 38 and, if the coolant limit value of 369° K. is exceeded, the control of the intake air preheating according to FIG. 4 is activated. The control unit 41 activates the electromagnetic actuator of the 3/2-way directional valve 33, which is displaced from the basic position (A) into the switch position (B). The partial vacuum of the vacuum pump 23 is supplied through the lines 24, 32 to the pressure modulator 34 in the intake pipe 3 and, modulated dependent on intake air temperature, supplied to the actuator 16 of the final control element 15. The partial vacuum is modulated in the pressure modulator 34 as a function of the intake air temperature, producing the adjustment angle of the final control element 15 and also being used for setting the preheated air stream via the exhaust manifold 17.

A forced shut-down of the intake air preheating is performed independently of the control unit 41 whenever the adjusting lever 50 of the fuel injection pump governor 26 exceeds a predetermined adjustment angle and the switch 48 is opened by the cam disc 49c, which is in effective connection with the adjusting lever 50. The 3/2-way directional valve 33 is deflected back into the basic position A represented in the drawing. The supply line to the actuator 16 is subjected to atmospheric pressure, which is taken through the lines 29, 29a from the passenger compartment. The line 14 carrying heated air is closed by the final control element 15, which is pivoted by the actuator 16.

An exhaust gas recirculation is performed in the range of characteristic curves according to FIG. 2 and according to the control sequence represented in FIG. 3. In an internal combustion engine operating with a load which is <75% of the useful power, the actuators of the 3/2-way directional valves 30 and 36 are triggered by the control unit 41. The 3/2-way valve 36 is displaced from the switch position A into the switch position B. The pressure from the vacuum pump 23 will then act on the diaphragm cell 13 which pivots the pressure control valve 12, so that the passage 11 is opened to its greatest extent. As a function of the adjustment angle of the adjusting lever 50, the pressure of the vacuum pump 23 is modulated in the vacuum control valve 25 and supplied to the pressure converter 27. The output working air stream of the pressure converter 27 is supplied to the actuator of the exhaust gas recirculation valve 19 in the switch position B of the 3/2-way directional valve 30 through line 31. As a function of the modulated working air stream, the exhaust gas recirculation valve 19 is fully or partially opened, so that exhaust gas is mixed in with the intake air.

Independently of the control unit 41, if a predetermined adjustment angle of the adjusting lever 50 of the fuel injection pump governor 26 is exceeded, the switches 46, 47 are opened by means of the cam discs 49a, 49b in effective connection with the adjusting lever 50. The 3/2-way directional valves 30, 36 are displaced from the switch position B into the switch position A. The actuator of the exhaust gas recirculation valve 19 and the diaphragm cell 13 are then subjected to atmospheric pressure, on the basis of which the exhaust gas recirculation valve 19 and the pressure control valve 12 are displaced into closed position. By means of series-connected switches 46, 47, the switch 46 is opened 5 angular degrees earlier than the switch 47.

Figure 5:
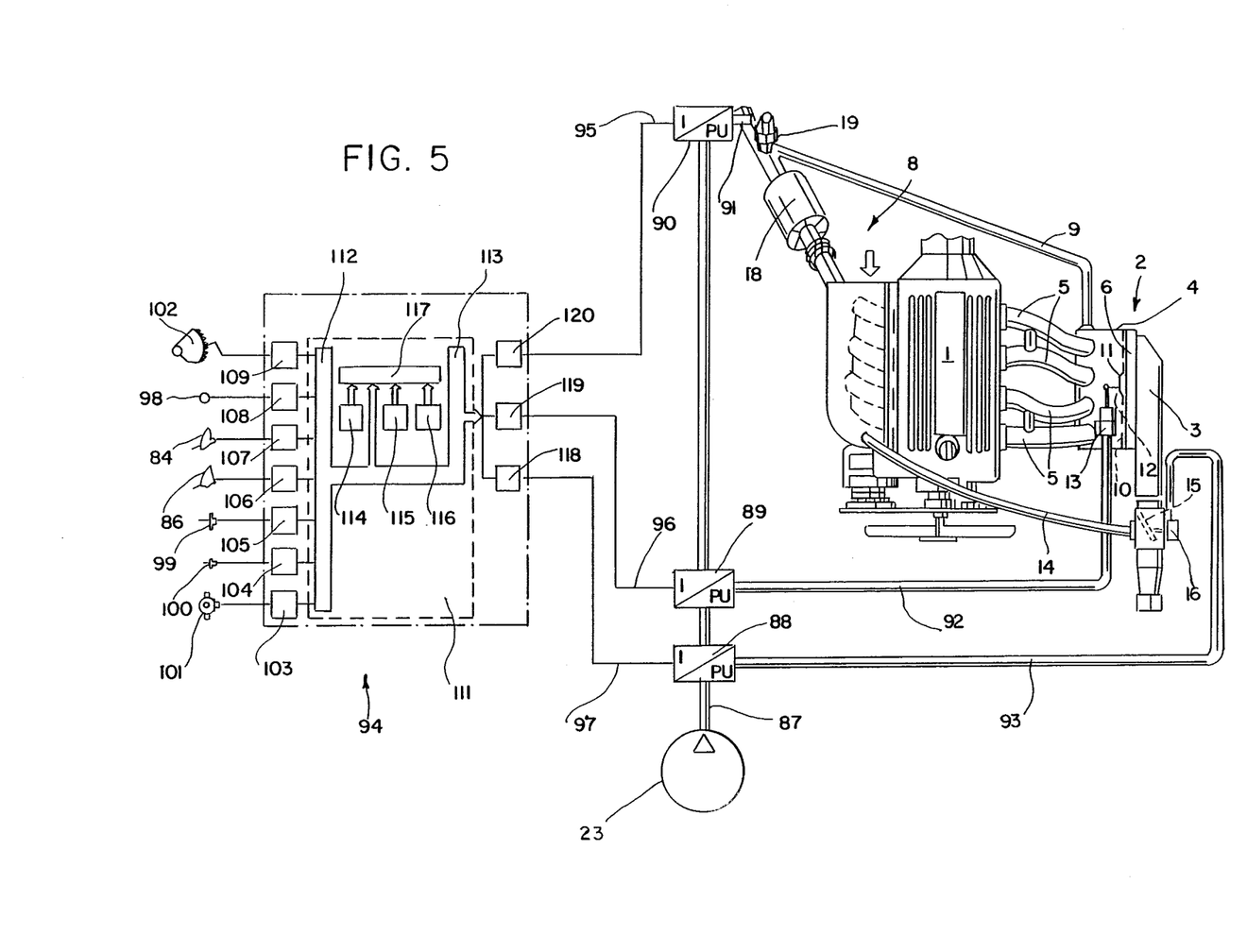
FIG. 5 show a block circuit diaphragm of a further exemplary embodiment of the apparatus for controlling intake air preheating and the exhaust gas recirculation.

In FIG. 5, the air compressing internal combustion engine 1 and an alternative embodiment of an apparatus for controlling the intake air preheating and exhaust gas recirculation is diagrammatically represented. The intake system 2 of the internal combustion engine 1 comprises the intake pipe 3 with an air circulation housing 4, from which the individual suction pipes 5 lead to the cylinders of the internal combustion engine 1. In the box-shape designed air circulation housing 4, accommodating an air filter 6, the exhaust gas recirculation line 9 opens in a mixing segment on the clean air side there. The recirculation line 9 connects the exhaust system 8 and the intake system 2.

The pressure control valve 12 located in the partition 10 is pivotable with a diaphragm cell 13 and the pivot angle is recorded by a sensor 84. From the exhaust system 8 with the soot burn-off filter 18 branches the exhaust gas recirculation line 9, in which the valve 19 is arranged, to which a sensor 86 is assigned.

From the vacuum pump 23 driven by the internal combustion engine 1, a tubular line 87 leads to electropneumatic pressure converters 88–90. From the electropneumatic pressure converter 90, a line 91 leads to the actuator of the valve 19, while a line 92 connects the electropneumatic pressure converter 89 to the diaphragm cell 13. The actuator 16 of the final control element 15 is connected to the electropneumatic converter 88 through a line 93.

A control unit 94 is connected by means of electric current-carrying lines 95-97 to the electropneumatic converters 88-90. Sensors 86, 98-101 record the atmospheric pressure, the pivot angle of the pressure control valve, the stroke of the exhaust gas recirculation valve, the intake air temperature and coolant temperature, and the control displacement of the fuel injection pump (not shown). The output signals of the sensors 86, 98-101 are supplied to measuring transducers 103-108 and the output signals of the sensor 102, which records the internal combustion engine speed, are supplied to a pulse shaper 109. The output signals of the measuring transducers 103-108 and of the pulse shaper 109 are supplied to a microcomputer system 111 of the control unit 94. The microcomputer system 111 comprises a data bus 117 connecting an input and output unit 112, 113, a CpU 114, a ROM 115 and a RAM 116. From the output unit 113 are activated the control unit side end stages 118-120 for the electropneumatic converters 88-90.

Figure 6:
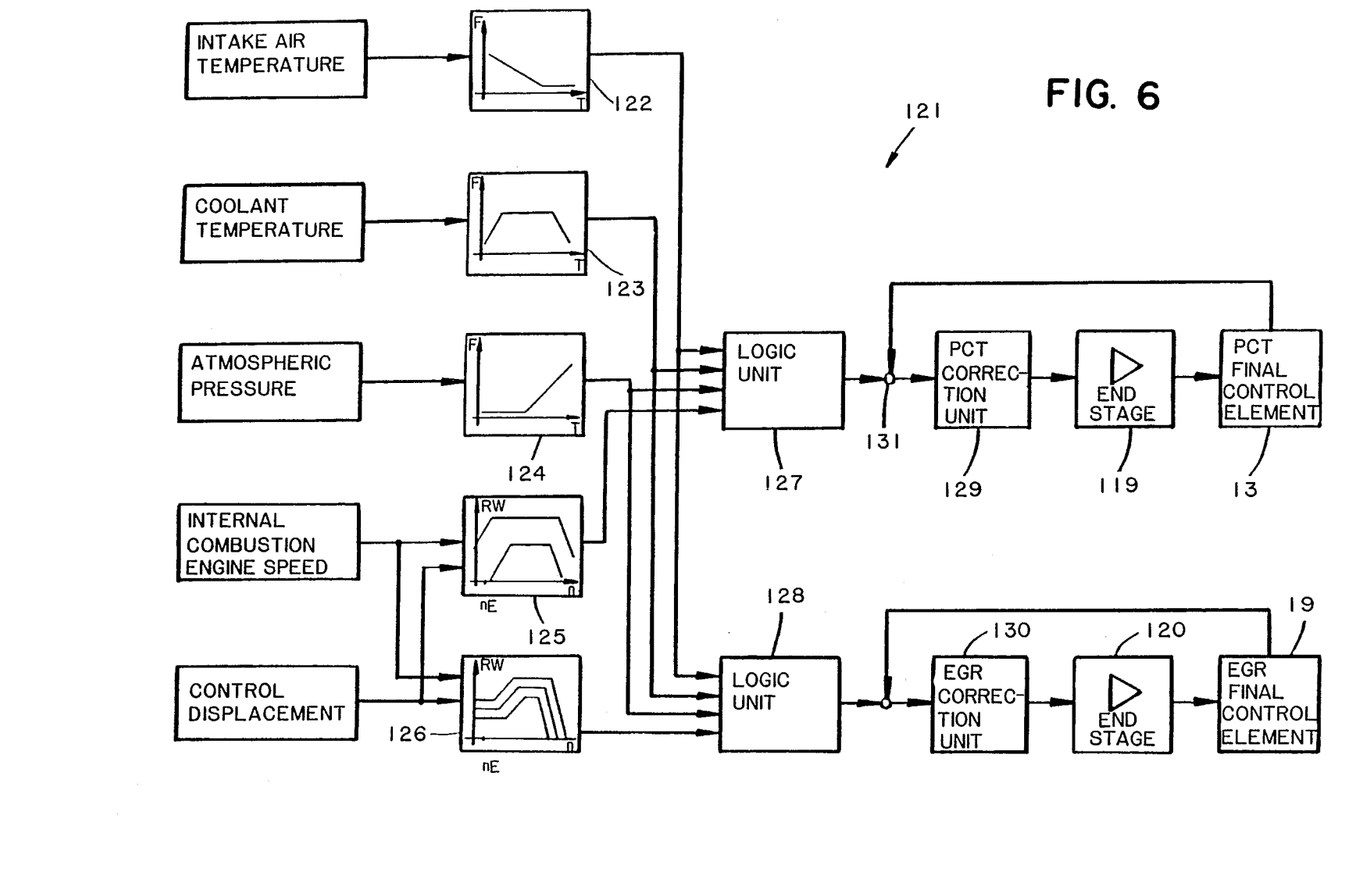
FIG. 6 shows a control of the exhaust gas recirculation for the embodiment of the apparatus according to FIG. 5 in a block circuit diaphragm.

In FIG. 6, the signal processing for the exhaust gas recirculation and pressure control valve regulation is represented in a block circuit diagram 121. The block circuit diagram 121 comprises functional blocks 122-126 with correction factors, logic units 127, 128, governors 129 and 130 and the end stages 119, 120 which operate the final control elements 13, 19 via the electropneumatic converters 89, 90 (not shown). As a function of the temperature of the intake air, a correction factor is determined in the functional block 122 according to the block symbol. This factor and a coolant temperature dependent correction factor determined according to the block symbol from functional block 123, along with a correction factor determined as a function of the atmospheric pressure according to the block symbol in the functional block 124, are supplied to the logic units 127, 128.

From a family of characteristic curves of the functional block 125, the correcting angle of the pressure control valve 12, which is supplied to the logic unit 127, can be determined as a function of the speed of the internal combustion engine and of the control displacement. With reference to the speed of the internal combustion engine and of the control rod displacement, the stroke to be set for the valve 19 is determined in the functional block 126 from a family of characteristic curves and supplied to the logic unit 128.

In the logic unit 127, multiplication of the correction factors by the value of the correcting angle from block 125 gives a reference input w from which, and from a controlled variable, a control deviation $x_w$ supplied to the pressure control valve governor 129 is determined at the summation point 131. The correcting variable of the governor 129 is fed to the end stage 119 which, with switching of the electropneumatic converter 89, operates the actuator of the final control element 13.

In the logic unit 128, multiplication of the correction factors by the correcting value of the stroke of the valve 19 gives a reference input w from which, and from a controlled variable, a control deviation $x_w$, which is fed to the governor 130 for the exhaust gas recirculation, is determined at the summation point 132. The correcting variable of the governor 130 is fed to the end stage 120 and, with switching of the electropneumatic converter 90, to the actuator of the final control element 19.

Figure 7:
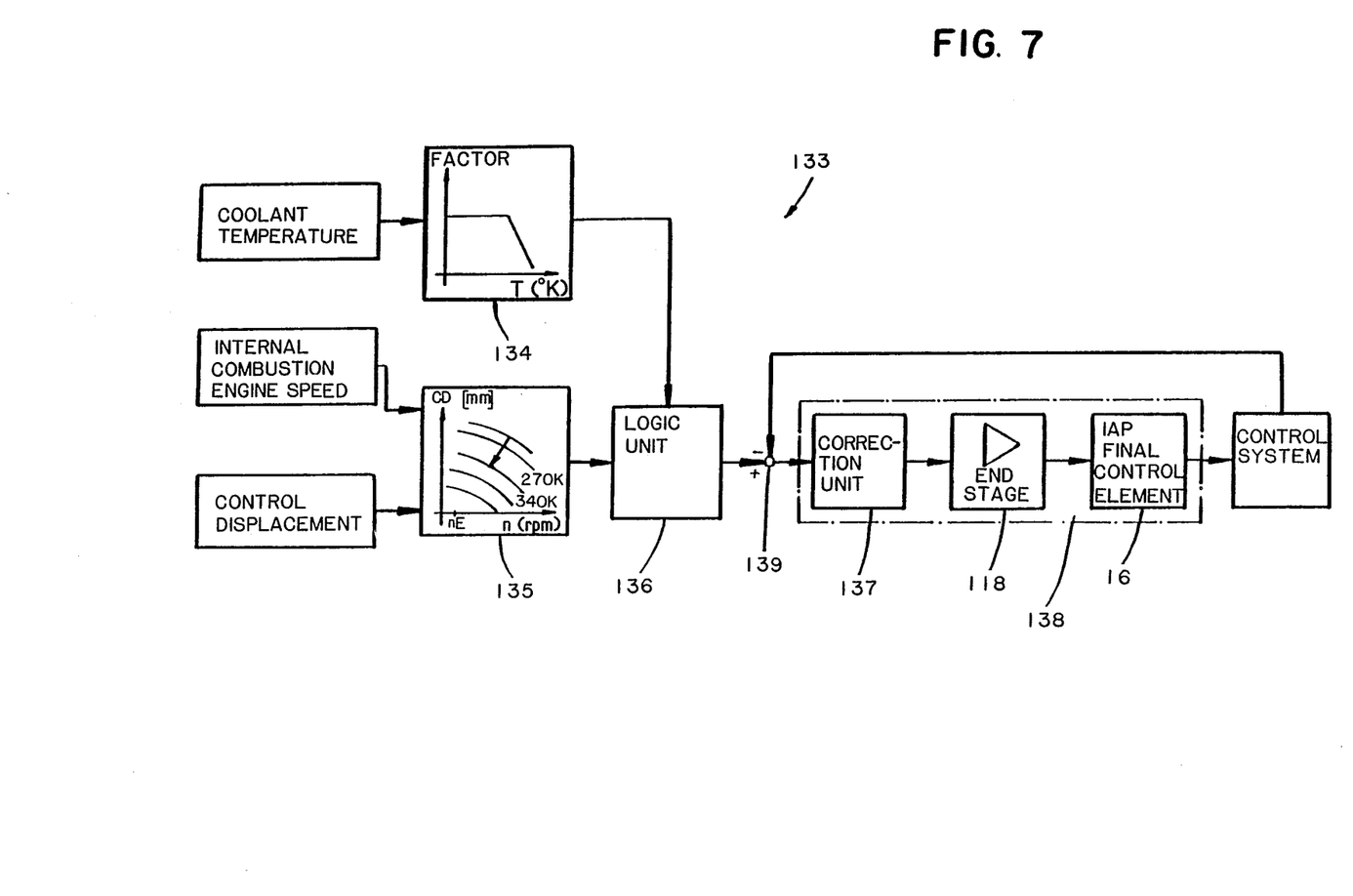
FIG. 7 shows a block circuit diaphragm of the control of the intake air preheating for the embodiment of the apparatus according to FIG. 5.

A block circuit diagram 133 of the regulation of the intake air preheating in FIG. 7 comprises functional blocks 134, 135, a logic unit 136 and a governor 138 having a correction unit 137, an end stage 118 and a final control element 16 designed as a diaphragm cell. According to the block symbol in the functional block 134, a correction factor is determined as a function of the coolant temperature and supplied to the logic unit 136. Dependent on internal combustion engine speed and control displacement, the intake air temperature is determined from a family of characteristic curves of the functional block 135 and, after multiplication by the correction value from the functional block 134, applied in the logic unit 136 to a summation point 139. The control deviation $x_w$ formed at the summation point 139 from the reference input w and the controlled variable x is supplied to a correction device 137 of the governor 138, which comprises the end stage 118 and the final control element 16.

The operating parameters recorded by the sensors 84, 86, 98-102 are supplied to the control unit 94. In the microcomputer system, the temperature of the intake air is controlled in accordance with the block circuit diagram according to FIG. 7 and the exhaust gas recirculation controlled in accordance with the block circuit diagram according to FIG. 6. The families of characteristic curves of the functional blocks 125, 126 and 135 are stored in the memory 115. The control deviations $x_w$ determined in the microcomputer system are supplied by a the output unit 113 to the end stages 118-120 which, with switching of the electropneumatic converters 88-90, operate the actuators of the final control elements 12, 15, 19.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A process for increasing the process temperature of an air compressing internal combustion engine having an exhaust gas recirculation line arranged between an exhaust gas line and an intake air line, with a final control element which is adjusted by a power-assisted actuator activated by a control unit, said actuator setting an amount of recirculated exhaust gas in dependence upon speed and loading of the internal combustion engine and the atmospheric pressure, said process including:
    preheating of the intake air when the temperature of a coolant is below a first predetermined limit, and the speed of the engine is
        (a) between a lower speed and an upper speed, and said engine is operating at a power level below 90% of the useful power of the internal combustion engine, or
        (b) between said upper speed and a speed corresponding to 90% of a nominal engine speed, and said engine is operating at a power level below 75% of the useful power of the internal combustion engine;
    recirculating exhaust gas when said coolant temperature is between said first predetermined limit and a lower second predetermined temperature limit, said engine speed is between said upper speed and a higher speed, and
said engine is operating at a power level below 75% of the useful power of the internal combustion engine; and reducing said recirculation when at least one of a predetermined vehicle velocity is exceeded and said engine is operating at a power level at or above 50% of the useful power.

2. The process according to claim 1, wherein said lower second predetermined limit of the coolant temperature is 25° C. and said first predetermined limit of the coolant temperature is 97° C.

3. The process according to claim 1, further including mixing of approximately 50% of the exhaust gas with air when said exhaust gas is being recirculated and said engine load is less than 50% of the useful power.

4. The process according to claim 1, further including: opening a final control element in said exhaust gas recirculation line when said exhaust gas is being recirculated and said engine load is less than 50% of the useful power; and pivoting a pressure control valve in a mixing segment into a closed position to increase a partial vacuum in said mixing segment.

5. The process according to claim 1, further including partially opening a final control element in the exhaust gas recirculation line and opening the pressure control valve when said exhaust gas is being recirculated and said engine load is greater than 50% of the useful power.

6. The process according to claim 5, further including determining said useful power by measuring a pivot angle of an adjusting lever on an injection pump governor of said engine.

7. The process according to claim 1, wherein the predetermined vehicle velocity is approximately 90 km/h.

8. An apparatus for increasing the process temperature of an air compressing internal combustion engine, said engine having a vacuum pump with a following vacuum control valve in a supply line to an actuator of an exhaust gas recirculation valve, and a fuel injection pump with an adjusting lever which is engaged with an accelerator pedal;
wherein said vacuum control valve is fixed on said fuel injection pump and is connected with said adjusting lever; and
wherein a modulated pressure output of the vacuum control valve, atmospheric pressure and a partial vacuum produced by the vacuum pump are inputs to a pressure converter, from which a line with a first power-assisted directional valve leads to said exhaust gas recirculation valve; and
wherein a supply line with a second power-assisted directional valve leads from the vacuum pump to a diaphragm load cell which actuates a control valve; and
wherein a further supply line with a third power-assisted directional valve and a pressure governor leads from the vacuum pump to an actuator of a final control element of the intake air preheating.

9. An apparatus according to claim 8, wherein said pressure governor includes a bimetal element around which preheated intake air flows.

10. An apparatus according to claim 8, including connecting lines for connecting a passenger compartment of the vehicle with atmosphere-side connections of the vacuum control valve of the pressure converter and those of the three directional valves.

11. An apparatus according to claim 10, wherein at least one of the power-assisted actuators of the three directional valves is an electromagnet.

12. An apparatus according to claim 11, including switches for triggering the actuators of the directional valves, and a cam disc connected with the adjusting lever for controlling said switches.

13. A process for increasing the process temperature of an air compressing internal combustion engine having an exhaust gas recirculation line arranged between the exhaust gas line and the intake air line, with a final control element which is adjusted by a power-assisted actuator, which is activated by a control unit that sets an instantaneous amount of recirculated exhaust gas with reference to speed and load of the internal combustion engine and also a coolant temperature and atmospheric pressure, said process including:
determining a temperature value dependent on load and speed from a predetermined family of characteristic intake air temperature curves, correcting said temperature value in dependence on coolant temperature, supplying said temperature value as a set value to a governor which changes the influx of preheated intake air to the stream of intake air by means of a first final control element; and
mixing of exhaust gas with the preheated stream of intake air by the operation of a second final control element which is in the exhaust gas recirculation line, depending on a predetermined internal combustion engine speed, and
controlling the pivot angle of a pressure control valve which is upstream of the junction of the exhaust gas recirculation line into an air circulation housing depending on load and speed from a predetermined family of characteristic pressure control valve curves, correcting said pivot angle by intake air temperature, coolant temperature, and atmospheric pressure, supplying said corrected pivot angle to a pressure control valve position governor which positions the pressure control valve via an actuator; and
determining the position of said second final control element in dependence on speed and load from a family of characteristic exhaust gas recirculation curves, and correcting said final control element position depending on the intake air temperature, coolant temperature and the atmospheric pressure and then supplying said corrected second final control element position to an exhaust gas recirculation position governor.

14. The process according to claim 13, further including determining the load condition of the internal combustion engine by control rod displacement on a fuel injection pump.

15. The process according to claim 13, wherein said predetermined internal combustion engine speed is approximately 500 rpm.

16. An apparatus for increasing the process temperature of an air compressing internal combustion engine, with a vacuum pump driven by the internal combustion engine, and a line leading from said pump to actuator of an exhaust gas recirculation valve, wherein:
a plurality of electropneumatic converters are connected by a pneumatic line to said vacuum pump and by electric lines to a control unit, a first actuating line leading from the first of said plurality of electropneumatic converters to an actuator of the exhaust gas recirculation valve, first sensor means for recording the stroke of said gas recirculating valve and supplying it to said control unit, and
wherein a second actuating line leads from a second of said plurality of electropneumatic converters to a diaphragm cell of a pressure control valve, second sensor means for recording a pivot angle of said pressure control valve and supplying it to said control unit, and wherein a third actuating line leads from a third of said plurality of electropneumatic converters to an actuator of a final control element, downstream of which a temperature sensor connected with said control unit is arranged in an air circulation housing.

* * * * *